Feb. 21, 1956     H. M. SAMSON     2,736,018
PICTURE TUBE CUSHIONING MEANS
Filed July 31, 1953
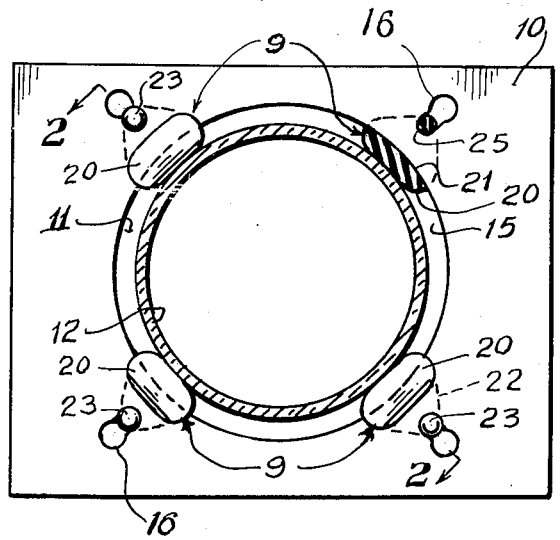
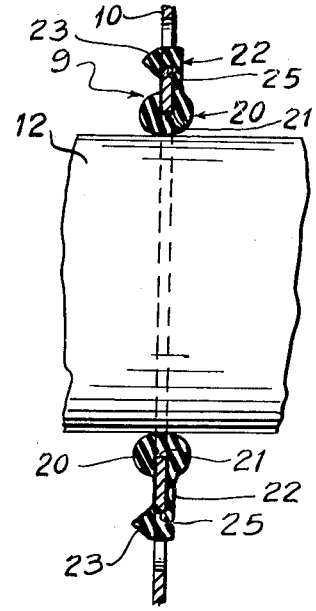
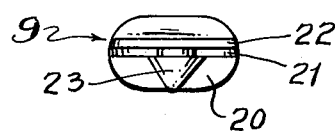
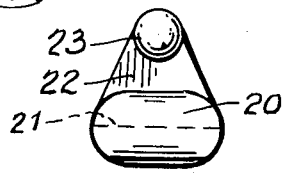
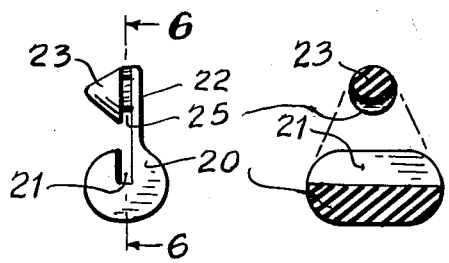
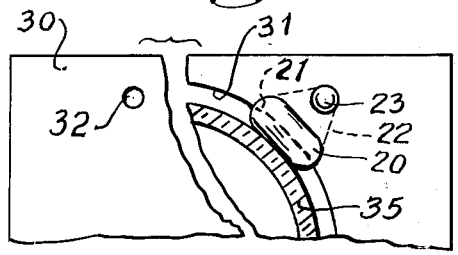
INVENTOR.
HAROLD M. SAMSON
BY Albert H. Merrill
ATTORNEY.

United States Patent Office 2,736,018
Patented Feb. 21, 1956

2,736,018
PICTURE TUBE CUSHIONING MEANS

Harold M. Samson, Sherman Oaks, Calif.

Application July 31, 1953, Serial No. 371,588

2 Claims. (Cl. 340—367)

This invention relates to a cushioning means which is more particularly intended for cushioning television picture tubes, but which may be used to advantage in a variety of other situations.

The invention pertains to a novel, cushioning clip and to a cushioning structure of which a plurality of such clips forms a part.

This invention can be used not only in television sets, but also around any tube of glass or other material to protect such a tube by dampening vibration, and when the tube is made of metal to electrically insulate it if that is required.

By this invention a means is provided both for locking in place a tubular member within an opening in a spaciously apertured plate which surrounds and supports such a member, and to cushion the supported tube within the apertured member.

One object of the invention is to provide, in order to carry out the aforesaid vibration dampening and protecting feature, a simplified structure wherein a smaller quantity of rubber or of elastic material will be required to obtain the desired protecting and vibration dampening results.

Another object is to provide an improved means for holding in place a plurality of cushioning clips upon the edge portion of the apertured part of the supporting plate or member for the picture tube or other member supported thereby.

The invention includes, as an article of manufacture, a novel clip of compressible, elastic material having spaced apart grooved portions to engage adjacent, oppositely directed edge portions of a plate between cut-out or apertured portions of said plate, so that the clip is securely, yet detachably held in place upon the plate in a position to perform the cushioning, insulating or other functions desired.

Other objects, advantages and features of the invention will hereinafter appear.

Referring to the accompanying drawing, which illustrates a preferred, reduced to practice embodiment of the invention.

Fig. 1 is a front face view of a supporting plate for the picture tube of a television set showing the invention applied thereto. A television tube is shown in section.

Fig. 2 is a sectional view of the structure shown in Fig. 1, the plane of section being indicated by line 2—2 on the latter view, the television tube being shown in side elevation.

Fig. 3 is a side elevation of one of the cushioning clips showing it on a larger scale than in Fig. 1.

Fig. 4 is a top view of the clip shown in Fig. 3.

Fig. 5 is a side view of the clip shown in Fig. 3 looking from right to left in relation to the latter view.

Fig. 6 is a section on line 6—6 of Fig. 5.

Fig. 7 is a fragmentary view showing in elevation a corner portion of a picture tube supporting plate, the view including a segment of the supported tube together with one of the cushioning clips. In this view circular openings are provided through the plate, instead of keyhole-shaped openings to provide an anchorage for the cushioning clip.

Referring in detail to the drawing, and first more particularly to Figs. 1 and 2, in these views a plurality of the clips 9 provided by this invention are shown in place upon a supporting plate or panel 10 having through it a spacious circular opening 11 to receive a picture tube 12. The present invention pertains to the improved means for supporting said tube within said opening 11 so that an annular space 15 is provided between the tube and the inner edge of the portion of plate 10 surrounding said opening 11. Said plate 10 is provided in a circumjacent relation to said opening 11 with a series of apertures 16 which preferably are individually of a keyhole shape as shown in Fig. 1.

Each said clip is of a compressible, elastic character and comprises an elongated body portion 20, preferably having its ends rounded as best shown in Figs. 3 and 4. From end to end of said body along one side thereof extends a deep, narrow groove 21, and a triangular wing 22 projects from said body 20, one of the three edges of said wing being joined to said body, that apex portion of said wing which is farthest from said groove carrying a laterally extending conical projection 23. The basal portion of said conical projection has formed in it an arcuate groove 25 which faces the aforesaid groove 21 so that the grooved portions of the clip are considerably spaced apart, as shown.

Although the projections 23 of said clips are preferably made conical to facilitate projecting them through small openings, yet it is to be understood that these projections may be otherwise shaped without exceeding the scope of the claimed invention.

In applying each clip 9 to the keyhole-shaped apertures of the panel structure shown in Figs. 1 and 2, the pointed projection 23 of the clip is first projected through the larger part of the keyhole-shaped aperture and the web or wing portion 22 of the clip is then brought up into a flatwise contact with that face of the panel which is next to the hand of the operator. Then the clip is moved toward the center of the panel opening 11, the wing of the clip being stretched sufficiently to allow the grooved body portion of the clip to be sprung over the adjacent part of the edge portion of the plate 10 around the opening 11. Said wing is so dimensioned as to hold the applied clip firmly in place with its grooved portions gripping between them the intact plate portion between the keyhole-shaped aperture and the large opening 11.

After all the clips have thus been put into place, the picture tube 12 is put into place as shown, said tube being large enough to compress somewhat the clip bodies 20, so that the clips securely, yet removably, maintain the picture tube in its mounted position.

In Fig. 7 is shown fragmentarily a plate or panel 30 having a large circular opening 31 through it and circular (instead of keyhole-shaped) apertures 32 located in a circumjacent relation to said large opening 31. This panel is shown having within its opening a television tube 35, the body portions of the clip 9 being interposed between the outer surface of said television tube and the edge portion of the plate 30 which surrounds said opening 31. The clips 9 will operate efficiently as shock absorbers and spacers for the television tube 35 when applied to the circularly apertured portions of said plate, but they are not so securely locked in place when applied to said circularly apertured plate parts as they are when applied to the keyhole-shaped apertures of the plate 10 previously described.

In placing the clips 9 into their mounted positions within the circular apertures 32 the conical projections 23 will undergo a diametrical compression, the basal portions of these projections being of a slightly greater diameter than said apertures.

Viewed in its broader aspect as an article of manufacture, this invention comprises a two-part clip, one of the parts 20 of which has an elastic extension 22 whereby it is connected to the other part 23 of the clip, each of said parts having in it at the same side of said extension as the other, a grooved portion which is directed toward and spaced away from the other grooved portion of the clip, so that by stretching said elastic extension the clip may be snapped onto a strip of sheet metal with the grooved portions of the clip in engagement with opposite edge portions of said strip.

I claim:

1. The combination with a plate having through it a spacious opening to receive a television tube or the like, there being a plurality of apertures through said plate circumjacent to said opening; of a set of elastic cushioning clips, said clips individually comprising two spaced apart portions each of which has in it a groove, the groove in one of said portions facing and being spaced away from the groove in the other of said portions, one of said grooves being positioned to fit over an edge portion of said plate beside any one of said apertures and the other of said grooves being positioned to fit over the adjacent edge portion of the plate which surrounds said one aperture, thus supporting a substantial portion of the clip in a position wherein it bridges the space between the edge of said opening and a tube spaced radially within the part of the plate surrounding said opening.

2. The subject matter of claim 1 and, said apertures through said plate each being keyhole shaped with the narrower part of each aperture directed toward the aforesaid spacious opening, each elastic clip having a laterally projecting portion with a diameter less than that of the circular part of each keyhole aperture and greater than the width of the narrower part of each said aperture.

References Cited in the file of this patent

UNITED STATES PATENTS

| | | |
|---|---|---|
| 1,371,337 | Whittington | Mar. 15, 1921 |
| 2,458,368 | Kaimin et al. | Jan. 4, 1949 |
| 2,542,753 | De Swart | Feb. 20, 1951 |
| 2,553,960 | De Swart | May 22, 1951 |
| 2,560,336 | Fisch | July 10, 1951 |
| 2,665,865 | Bell | Jan. 12, 1954 |